United States Patent
Strilchuk et al.

(12) 
(10) Patent No.: US 7,300,098 B2
(45) Date of Patent: Nov. 27, 2007

(54) ACCESS DOOR FOR REAR STORAGE COMPARTMENT OF A MOTORIZED TRICYCLE

(75) Inventors: Larry David Strilchuk, Clyde (CA); Jeremy Myers, Calgary (CA)

(73) Assignee: Lehman Trikes U.S.A., Inc., Spearfish, SD (US)

( * ) Notice: Subject to any disclaimer, the term of this patent is extended or adjusted under 35 U.S.C. 154(b) by 134 days.

(21) Appl. No.: 11/173,936

(22) Filed: Jul. 1, 2005

(65) Prior Publication Data

US 2007/0001478 A1    Jan. 4, 2007

(51) Int. Cl.
*B60J 5/00* (2006.01)
(52) U.S. Cl. .................................................. 296/146.8
(58) Field of Classification Search ............. 296/146.8, 296/146.9, 146.11, 146.12, 151, 146.1, 50, 296/51, 56, 37.1
See application file for complete search history.

(56) References Cited

U.S. PATENT DOCUMENTS 6,471,284 B2 * 10/2002 Landmesser ............. 296/146.8
6,644,707 B2 * 11/2003 McLaughlin et al. .... 296/26.09
7,143,548 B2 * 12/2006 Kleinmann et al. ........... 49/345

OTHER PUBLICATIONS

A photograph, predating the filing date of this application, which shows a related hinge door which is used to provided access to a storage compartment of a bus.

* cited by examiner

*Primary Examiner*—H Gutman
(74) *Attorney, Agent, or Firm*—Davis Bujold & Daniels, P.L.L.C.

(57) ABSTRACT

An access door for a rear storage compartment of a motorized tricycle. A motorized tricycle is provided having a rear storage compartment with a rearward facing access opening. An access door, when in a closed position, is positioned in a substantially vertical orientation in the access opening. A hinge assembly is provided having a door mounting secured to the access door and a body mounting secured to the motorized tricycle. At least one pivot linkage is positioned on each side of the access door extending between the door mounting and the body mounting. The pivot linkage accommodates movement of the access door from the closed position in the access opening to an open position with a bottom edge of the access door positioned above the access opening, while maintaining the access door in a substantially vertical orientation during pivotal movement.

11 Claims, 4 Drawing Sheets

US 7,300,098 B2

ACCESS DOOR FOR REAR STORAGE COMPARTMENT OF A MOTORIZED TRICYCLE

FIELD OF THE INVENTION

The present invention relates to an access door for a rear storage compartment of a motorized tricycle.

BACKGROUND OF THE INVENTION

Motorized tricycles have a rear storage compartment with an access door that faces rearward in a substantially vertical orientation. The access door either opens downward like a tail gate of a pick up truck or upward like a rear door of a minivan. The downward opening access door requires the user to access cargo over top of the access door. The upward opening door requires the user to crouch in order to view and access the storage compartment contents.

SUMMARY OF THE INVENTION

According to the present invention there is provided an access door for a rear storage compartment of a motorized tricycle. A motorized tricycle is provided having a rear storage compartment with a rearward facing access opening. An access door, when in a closed position, is positioned in a substantially vertical orientation in the access opening. A hinge assembly is provided having a door mounting secured to the access door and a body mounting secured to the motorized tricycle. At least one pivot linkage is positioned on each side of the access door extending between the door mounting and the body mounting. The pivot linkage accommodates movement of the access door from the closed position in the access opening to an open position with a bottom edge of the access door positioned above the access opening, while maintaining the access door in a substantially vertical orientation during pivotal movement.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
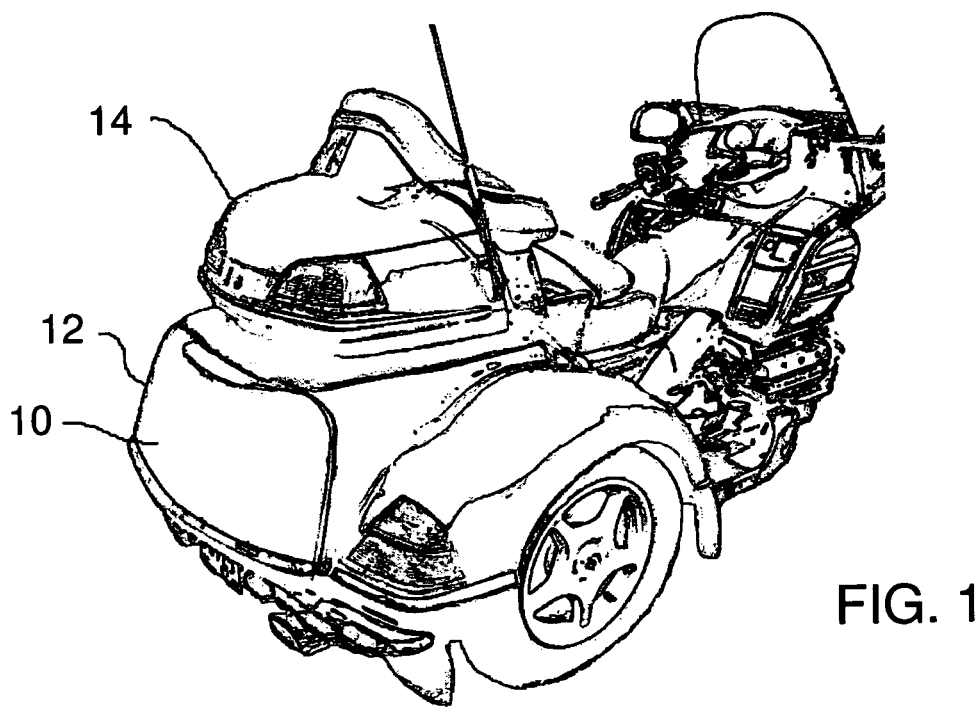
FIG. 1 is a perspective view of the access door for a rear storage compartment of a motorized tricycle constructed in accordance with the teachings of the present invention, with the access door in the closed position.

The preferred embodiment, an access door for a rear storage compartment of a motorized tricycle generally identified by reference numeral 10, will now be described with reference to FIG. 1 through 6.

Structure and Relationship of Parts

Figure 2:
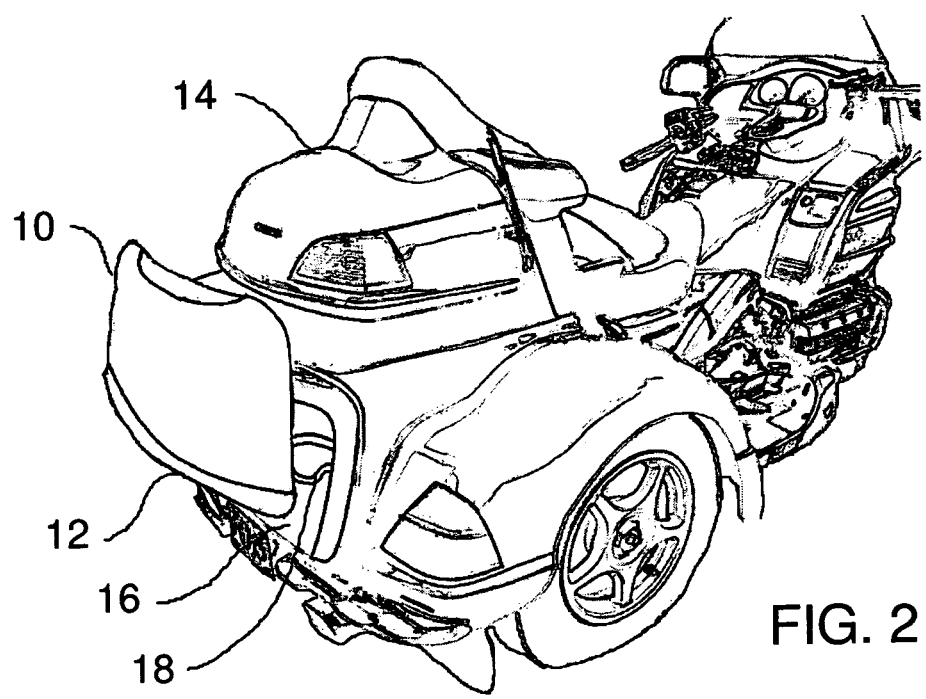
FIG. 2 is a perspective view of the access door illustrated in FIG. 1, with the access door moving from the closed position to the open position.
Figure 3:
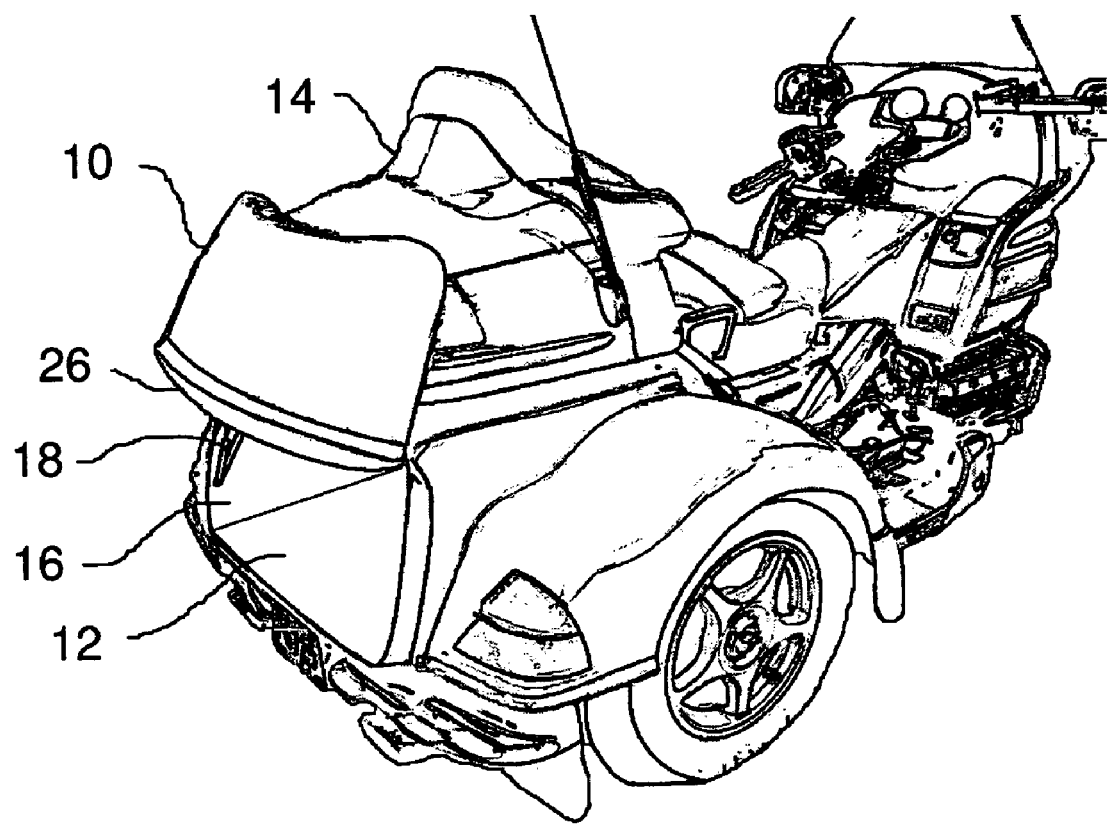
FIG. 3 is a perspective view of the access door illustrated in FIG. 1, with the access door in the open position.
Figure 4:
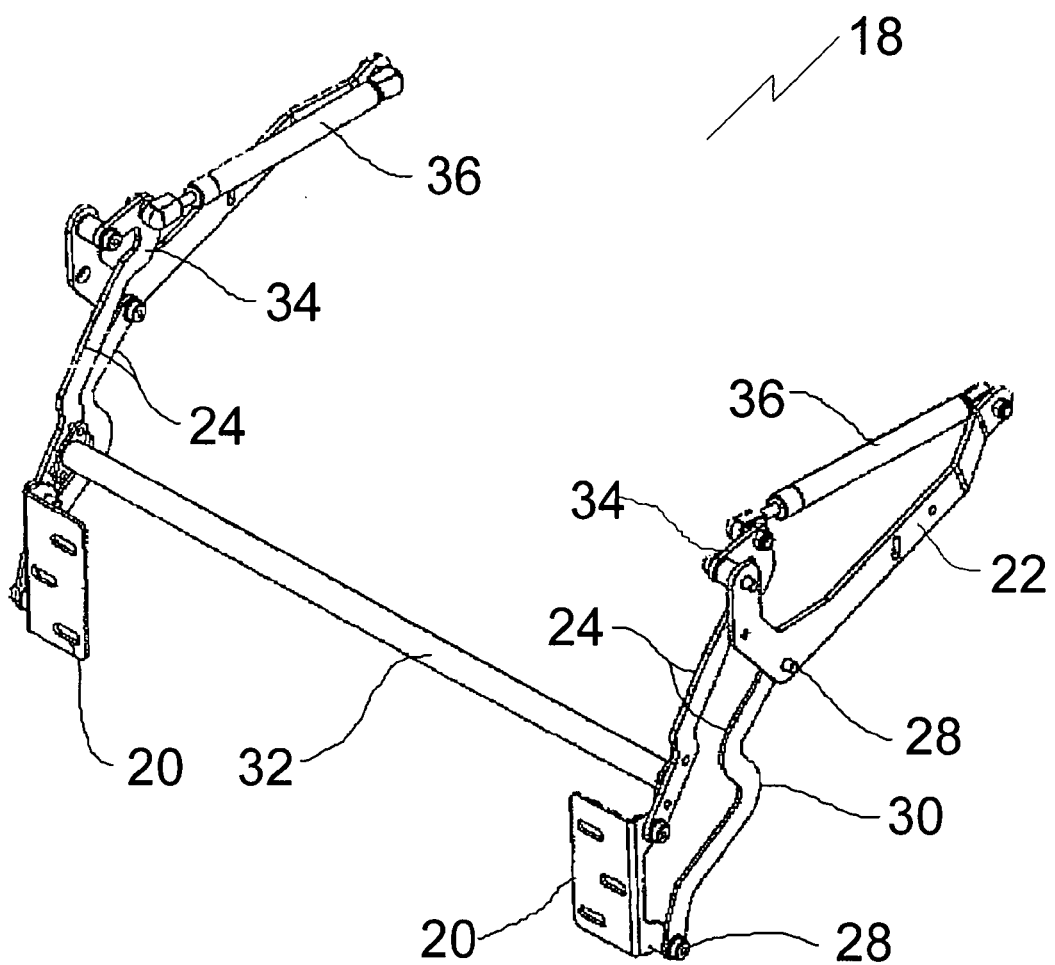
FIG. 4 is a detailed perspective view of the underlying hinge assembly for the access door illustrated in FIG. 1.
Figure 5:
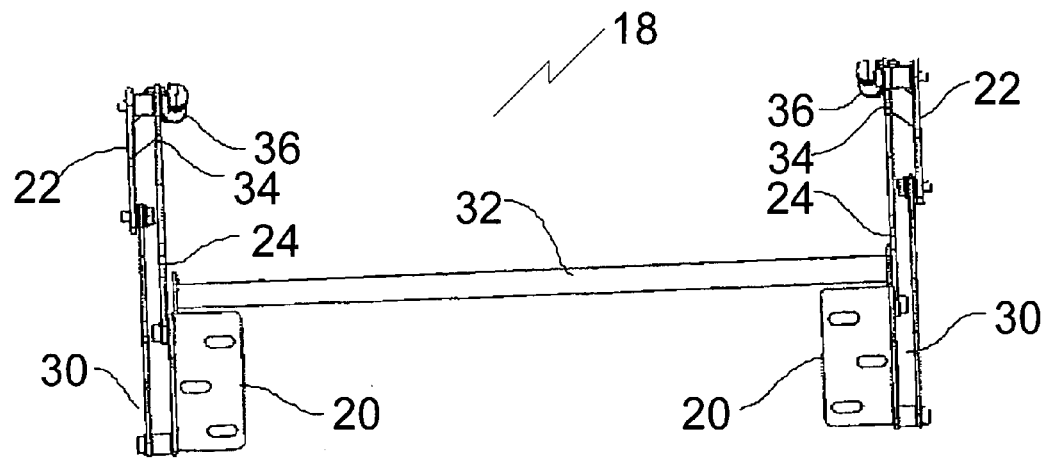
FIG. 5 is a front elevation view of the hinge assembly illustrated in FIG. 4.
Figure 6:
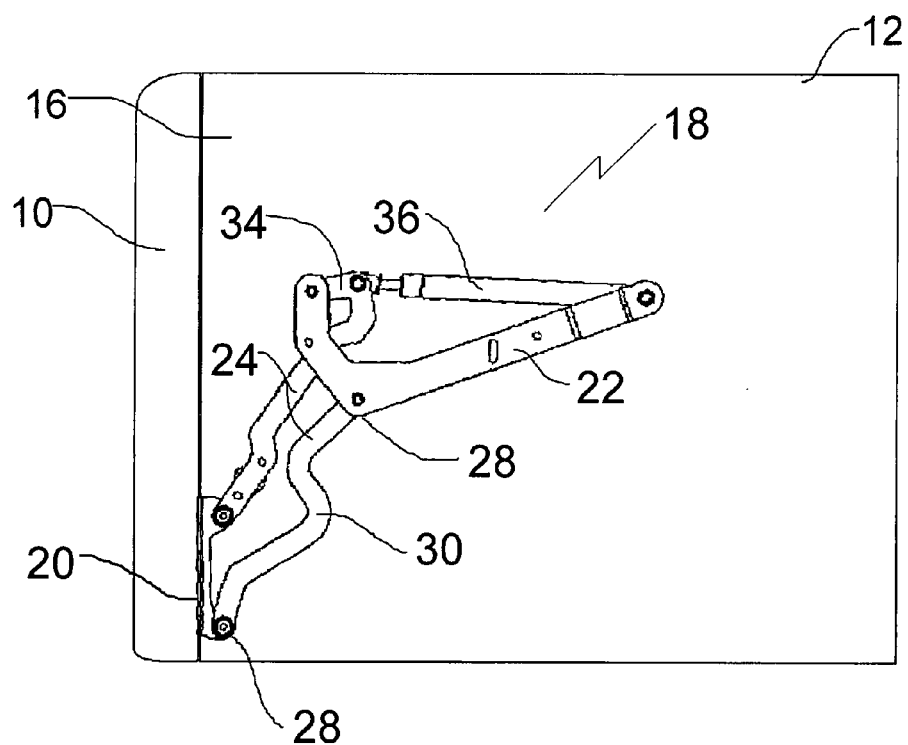
FIG. 6 is an end elevation view of the hinge assembly illustrated in FIG. 4.

Referring now to FIG. 1, there is shown access door 10 for a rear storage compartment 12 of a motorized tricycle 14. Referring to FIG. 2, motorized tricycle 14 has a rear storage compartment 12 with a rearward facing access opening 16. Access door 10, when in a closed position as shown in FIG. 1, is positioned in a substantially vertical orientation in access opening 16. Referring to FIG. 6, there is illustrated a hinge assembly, indicated generally by reference numeral 18, that has a door mounting 20 secured to access door 10 and a body mounting 22 secured to the inside of rear storage compartment 12 in motorized tricycle 14. As depicted, door mounting 20 is slotted to allow door 10 to shift to the left or right slightly to allow for adjustments. Body mounting 22 acts as a common mounting plate for the other components of hinge assembly 18, and has slotted connections that permit hinge 18 to rotate to provide a better fit between access door 10 and storage compartment 12. Referring to FIG. 4, there is a pair of pivot linkages 24 are such that a pivot linkage 24 can be positioned on each side of access door 10 extending between door mounting 20 and a body mounting 22, preferably only one per pivot linkage 24. Pivot linkages 24 accommodate movement of access door 10 from the closed position in access opening 16 shown in FIG. 1 to an open position with a bottom edge 26 of access door 10 positioned above access opening 16 as shown in FIG. 3, while maintaining access door 10 in a substantially vertical orientation during pivotal movement, as shown in FIG. 2. Referring to FIG. 6, pair of pivot linkages 24 have end portions 28 with an ogee curved transition portion 30 between end portions 28. Pivot linkages 24 have an over-centre bias which maintains access door 10 in the open position. The over centre bias is created by a generally U-shaped end portion 34 of pivot linkages 24 on each side. It will be appreciated that this over centre mechanism was constructed to address space consraints, other forms of over centre mechanism can be used. A fluid cylinder 36, such as a gas cylinder, is provided between the body mounting 22 and pivot linkage 24 on at least one side, and preferably on both as depicted, to dampen movement of access door 10 when pivoting between the open position and the closed position. It will be appreciated that fluid cylinder 36 need not be a gas cylinder, but could be hydraulic. Referring to FIG. 5, a brace 32 extends between pivot linkages 24 on each side.

Operation

The use and operation of access door 10 will now be discussed with reference to FIGS. 1 through 6. Referring to FIG. 1, access door 10 starts in the closed position. Referring to FIG. 2, access door 10 is manually lifted, with such movement being accommodated by hinge assembly 18. Hinge assembly 18 permit movement of access door 10 upwards from access opening 16 of storage compartment 12. Referring to FIG. 3, when hinge assembly 18 is fully extended, access door 10 is in a relatively vertical position with bottom edge 26 positioned above access opening 16. When access door 10 is in the open position, access door is retained in position by an over centre mechanism incorporated into hinge 18, provided by U-shaped end portions 34 of pivot linkages 24. Movement of access door 10 is dampened, especially upon closing by fluid cylinder 36. The configuration of pivot linkages 24 with ogee curves, assists in permitting the necessary movement without taking up space in the storage compartment. The use of body mounting 22 as a common mounting for fluid cylinder 36 and both linkage arms, simplifies installation.

Advantages

With the present invention, the access door moves up and out of the way. This movement and open door positioning allows the user full view of the contents of the storage compartment and unrestricted access to its contents. The addition of accessories to the motorized tricycle, such as a trailer hitch, does not interfere with use of the access door or access door positioning in the open positioning, as it does with other access door configurations.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. An access door for a rear storage compartment of a motorized tricycle, comprising in combination:
   a motorized tricycle having a rear storage compartment with a rearward facing access opening;
   an access door, when in a closed position, being positioned in the access opening; and
   a hinge assembly having a door mounting secured to the access door and a body mounting secured to the motorized tricycle, at least one pivot linkage on each side of the access door extending between the door mounting and the body mounting, the at least one pivot linkage accommodating movement of the access door from the closed position in the access opening to an open position with a bottom edge of the access door positioned above the access opening, while maintaining the access door in a substantially vertical orientation during pivotal movement.

2. The access door as defined in claim 1, wherein a pair of the pivot linkages are provided in spaced relation on each side of the access door.

3. The access door as defined in claim 1, wherein the at least one pivot linkage has an over-center bias which maintains the access door in the open position.

4. The access door as defined in claim 1, wherein a fluid cylinder is provided between the body mounting and the at least one pivot linkage on at least one side to dampen movement of the access door when pivoting between the open position and the closed position.

5. The access door as defined in claim 4, wherein the fluid cylinder is a gas cylinder.

6. The access door as defined in claim 2, wherein the pair of the pivot linkages have end portions with an ogee curved transition portion between the end portions.

7. The access door as defined in claim 3, wherein the over center bias is created by a generally U-shaped end portion of the at least one pivotal linkage on each side.

8. The access door as defined in claim 1, wherein a brace extends between the at least one pivot linkage on each side.

9. An access door for a rear storage compartment of a motorized tricycle, comprising in combination:
   a motorized tricycle having a rear storage compartment with a rearward facing access opening;
   an access door, when in a closed position, being positioned in a substantially vertical orientation in the access opening; and
   a hinge assembly having a door mounting secured to the access door and a body mounting secured to the motorized tricycle, a pair of pivot linkages in spaced relation on each side of the access door extending between the door mounting and the body mounting, the pair of pivot linkages accommodating movement of the access door from the closed position in the access opening to an open position with a bottom edge of the access door positioned above the access opening, while maintaining the access door in a substantially vertical orientation during pivotal movement, one linkage of the pair of pivot linkages having an over-center bias which maintains the access door in the open position;
   a brace extending between the pair of pivot linkages; and
   a fluid cylinder between the body mounting and the one linkage of the pair of pivot linkages to dampen movement of the access door when pivoting between the open position and the closed position.

10. The access door as defined in claim 9, wherein the pair of pivot linkages have end portions with an ogee curved transition portion between the end portions.

11. The access door as defined in claim 9, wherein the over-center bias is created by a generally U-shaped end portion of each pair of pivotal linkages on each side.

* * * * *